United States Patent
Hwang et al.

(10) Patent No.: US 11,572,439 B2
(45) Date of Patent: Feb. 7, 2023

(54) COPOLYCARBONATE AND POLYCARBONATE COMPOSITION COMPRISING THE SAME

(71) Applicant: LG CHEM, LTD., Seoul (KR)

(72) Inventors: Young Young Hwang, Daejeon (KR); Youngwook Son, Daejeon (KR); Daehyeon Hwang, Daejeon (KR); Mooho Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 154 days.

(21) Appl. No.: 17/276,678

(22) PCT Filed: Jul. 29, 2020

(86) PCT No.: PCT/KR2020/009961
§ 371 (c)(1),
(2) Date: Mar. 16, 2021

(87) PCT Pub. No.: WO2021/045390
PCT Pub. Date: Mar. 11, 2021

(65) Prior Publication Data
US 2021/0269590 A1 Sep. 2, 2021

(30) Foreign Application Priority Data

Sep. 2, 2019 (KR) .................. 10-2019-0108427
Jul. 28, 2020 (KR) .................. 10-2020-0093464

(51) Int. Cl.
*C08G 64/18* (2006.01)
*C08G 77/448* (2006.01)
*C08G 64/08* (2006.01)
*C08L 69/00* (2006.01)
*C08G 77/445* (2006.01)

(52) U.S. Cl.
CPC ......... *C08G 64/186* (2013.01); *C08G 64/085* (2013.01); *C08G 77/445* (2013.01); *C08G 77/448* (2013.01); *C08L 69/00* (2013.01); *C08L 2205/025* (2013.01)

(58) Field of Classification Search
None
See application file for complete search history.

(56) References Cited

U.S. PATENT DOCUMENTS

| | | |
|---|---|---|
| 6,072,011 A | 6/2000 | Hoover |
| 2016/0002412 A1 | 1/2016 | Iyer et al. |
| 2016/0297926 A1 | 10/2016 | Hwang et al. |
| 2017/0321014 A1 | 11/2017 | Lee et al. |
| 2018/0044479 A1 | 2/2018 | Hwang et al. |
| 2018/0305499 A1 | 10/2018 | Shin et al. |
| 2019/0112421 A1 | 4/2019 | Lee et al. |
| 2019/0330466 A1 | 10/2019 | Bahn et al. |

FOREIGN PATENT DOCUMENTS

| | | |
|---|---|---|
| CN | 105940035 A | 9/2016 |
| CN | 108884220 A | 11/2018 |
| EP | 1029888 A1 | 8/2000 |
| JP | H05-247195 A | 9/1993 |
| JP | 3831834 | 10/2006 |
| JP | 2007-112845 | 5/2007 |
| JP | 2008024870 * | 2/2008 |
| JP | 2015-174897 | 10/2015 |
| JP | 2017-501242 A | 1/2017 |
| JP | 2017-524771 A | 8/2017 |
| JP | 2017-536424 A | 12/2017 |
| JP | 2018-145439 A | 9/2018 |
| JP | 2018-530663 A | 10/2018 |
| KR | 10-2013-0100274 | 9/2013 |
| KR | 10-2017-0009593 | 1/2017 |
| KR | 10-2017-0045092 | 4/2017 |
| KR | 10-2017-0091506 | 8/2017 |
| KR | 10-2018-0043683 | 4/2018 |
| KR | 10-2018-0047837 A | 5/2018 |
| WO | 1999-024509 A1 | 5/1999 |
| WO | 2012-026236 A1 | 3/2012 |
| WO | 2016-089137 A1 | 6/2016 |

OTHER PUBLICATIONS

Sun et al., "Modification of Recycled Polycarbonate with Core-Shell Structured Latexes for Enhancement of Impact Resistance and Flame Retardancy," Journal of Applied Polymer Science, Jan. 14, 2010, vol. 116, pp. 2451-2464.

* cited by examiner

*Primary Examiner* — David J Buttner
(74) *Attorney, Agent, or Firm* — Dentons US LLP

(57) ABSTRACT

Provided are a copolycarbonate and a polycarbonate composition comprising the same. The copolycarbonate comprises repeat units of the following Chemical Formula 1 and repeat units of the following Chemical Formula 2:

Chemical Formula 1

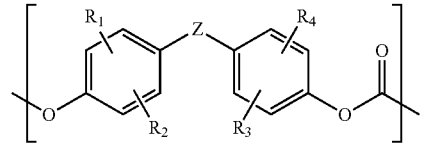

Chemical Formula 2

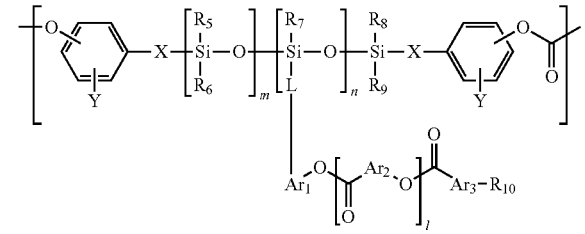

6 Claims, No Drawings

COPOLYCARBONATE AND POLYCARBONATE COMPOSITION COMPRISING THE SAME

CROSS-REFERENCE TO RELATED APPLICATIONS

This application is a National Stage Application of International Application No. PCT/KR2020/009961 filed on Jul. 29, 2020, which claims the benefit of priority to Korean Patent Application No. 10-2019-0108427 filed on Sep. 2, 2019 and Korean Patent Application No. 10-2020-0093464 filed on Jul. 28, 2020 with the Korean Intellectual Property Office, the disclosures of which are herein incorporated by reference in their entirety.

TECHNICAL FIELD

The present disclosure relates to copolycarbonate and a polycarbonate composition comprising the same.

BACKGROUND

Polycarbonate is prepared by polycondensation of an aromatic diol such as bisphenol A and a carbonate precursor such as phosgene, has excellent impact strength, dimensional stability, heat resistance and transmittance, and the like, and is applied in various fields such as exterior materials of electric and electronic products, automobile parts, building materials, optical components, clothing materials, and the like.

Recently, for such polycarbonate, a lot of studies are being attempted to copolymerize two or more kinds of aromatic diol compounds having different structures to introduce repeat units of different structures into the main chain of polycarbonate, thus obtaining desired properties, so as to apply for more various fields.

Polycarbonate is also used as automobile exterior material due to its excellent impact resistance, but recently, there is an increasing customer demand for novel material that not only exhibits excellent impact resistance as polycarbonate, but also has excellent scratch resistance, weather resistance, and the like.

BRIEF DESCRIPTION

Technical Problem

It is an object of the present disclosure to provide copolycarbonate that not only has excellent impact resistance, but also has remarkably improved weather resistance, and a polycarbonate composition comprising the same.

Technical Solution

According to one embodiment of the present disclosure, there is provided a copolycarbonate comprising repeat units of the following Chemical Formula 1 and repeat units of the following Chemical Formula 2:

Chemical Formula 1

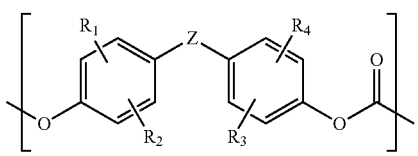

wherein in Chemical Formula 1:

$R_1$ to $R_4$ are each independently hydrogen, $C_{1-10}$ alkyl, $C_{1-10}$ alkoxy, or halogen, Z is $C_{1-10}$ alkylene that is unsubstituted or substituted with phenyl, $C_{3-15}$ cycloalkylene that is unsubstituted or substituted with $C_{1-10}$ alkyl, O, S, SO, $SO_2$, or CO, Chemical Formula 2

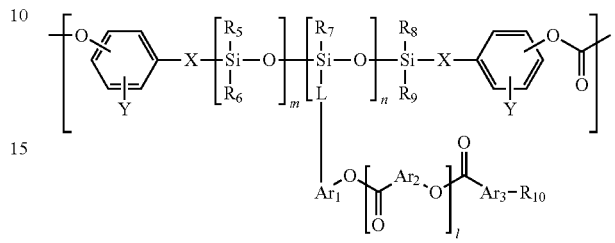

wherein in Chemical Formula 2:

$R_5$, $R_6$, $R_7$, $R_8$ and $R_9$ are each independently hydrogen; halogen; allyl; $C_{1-15}$ alkyl that is unsubstituted or substituted with one or more selected from the group consisting of halogen, $C_{1-10}$ alkoxy and $C_{6-20}$ aryl; $C_{1-10}$ alkoxy that is unsubstituted or substituted with one or more selected from the group consisting of halogen, $C_{1-10}$ alkoxy and $C_{6-20}$ aryl; or $C_{6-20}$ aryl that is unsubstituted or substituted with one or more selected from the group consisting of halogen, $C_{1-15}$ alkyl and $C_{1-10}$ alkoxy;

$R_{10}$ is hydrogen, $C_{1-6}$ alkyl, halogen, hydroxy, $C_{1-6}$ alkoxy, or $C_{6-20}$ aryl;

each X is independently $C_{1-10}$ alkylene, —(OCO)—($C_{1-10}$ alkylene)-, or —(COO)—($C_{1-10}$ alkylene)-;

each Y is independently hydrogen, $C_{1-6}$ alkyl, halogen, hydroxy, $C_{1-6}$ alkoxy, or $C_{6-20}$ aryl;

L is $C_{3-10}$ alkylene;

$Ar_1$, $Ar_2$ and $Ar_3$ are each independently $C_{6-20}$ arylene that is unsubstituted or substituted with one or more selected from the group consisting of halogen, $C_{1-15}$ alkyl and $C_{1-10}$ alkoxy;

n and m are each independently an integer from 1 to 999, and l is an integer from 0 to 999.

According to another embodiment of the present disclosure, there is provided a polycarbonate composition comprising the copolycarbonate.

Advantageous Effects

The copolycarbonate according to one embodiment has excellent impact resistance, particularly low temperature impact resistance, and excellent weather resistance. Thus, using the copolycarbonate, it is expected to provide automobile exterior material of which properties are not changed even under extreme environment.

DETAILED DESCRIPTION

Hereinafter, copolycarbonate and a polycarbonate composition comprising the same according to specific embodiments of the present disclosure will be explained in detail.

According to one embodiment of the present disclosure, there is provided a copolycarbonate comprising repeat units of the following Chemical Formula 1 and repeat units of the following Chemical Formula 2:

Chemical Formula 1

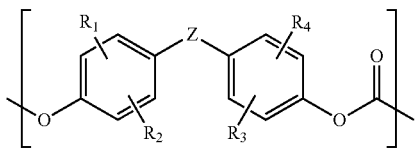

wherein in Chemical Formula 1:

$R_1$ to $R_4$ are each independently hydrogen, $C_{1-10}$ alkyl, $C_{1-10}$ alkoxy, or halogen; and Z is $C_{1-10}$ alkylene that is unsubstituted or substituted with phenyl, $C_{3-15}$ cycloalkylene that is unsubstituted or substituted with $C_{1-10}$ alkyl, O, S, SO, $SO_2$, or CO, Chemical Formula 2

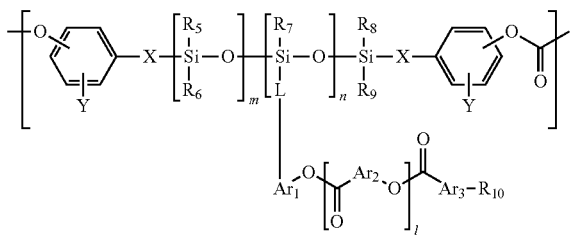

wherein in Chemical Formula 2:

$R_5$, $R_6$, $R_7$, $R_8$ and $R_9$ are each independently hydrogen; halogen; allyl; $C_{1-15}$ alkyl that is unsubstituted or substituted with one or more selected from the group consisting of halogen, $C_{1-10}$ alkoxy and $C_{6-20}$ aryl; $C_{1-10}$ alkoxy that is unsubstituted or substituted with one or more selected from the group consisting of halogen, $C_{1-10}$ alkoxy and $C_{6-20}$ aryl; or $C_{6-20}$ aryl that is unsubstituted or substituted with one or more selected from the group consisting of halogen, $C_{1-15}$ alkyl and $C_{1-10}$ alkoxy;

$R_{10}$ is hydrogen, $C_{1-6}$ alkyl, halogen, hydroxy, $C_{1-6}$ alkoxy, or $C_{6-20}$ aryl;

each X is independently $C_{1-10}$ alkylene, —(OCO)—($C_{1-10}$ alkylene)-, or —(COO)—($C_{1-10}$ alkylene)-;

each Y is independently hydrogen, $C_{1-6}$ alkyl, halogen, hydroxy, $C_{1-6}$ alkoxy, or $C_{6-20}$ aryl;

L is $C_{3-10}$ alkylene;

$Ar_1$, $Ar_2$ and $Ar_3$ are each independently $C_{6-20}$ arylene that is unsubstituted or substituted with one or more selected from the group consisting of halogen, $C_{1-15}$ alkyl and $C_{1-10}$ alkoxy; and n and m are each independently an integer from 1 to 999, and l is an integer from 0 to 999.

A copolycarbonate means a polymer in which a polysiloxane structure in which aromatic groups linked by an ester group or repeat units including two or more aromatic groups linked by ester groups are introduced at the side chain, is introduced at the main chain of polycarbonate, and specifically, it comprises repeat units of Chemical Formula 1 and repeat units of Chemical Formula 2.

The main chain of copolycarbonate has repeat units formed by the reaction of diol compounds and carbonate precursors, and comprises repeat units of Chemical Formula 1.

In Chemical Formula 1, $R_1$ to $R_4$ are each independently, for example, hydrogen, methyl, methoxy, chloro, or bromo.

In Chemical Formula 1, Z can be linear or branched $C_{1-10}$ alkylene that is unsubstituted or substituted with phenyl.

Specifically, Z can be, for example, methylene, ethan-1,1-diyl, propane-2,2-diyl, butane-2,2-diyl, 1-phenylethane-1,1-diyl, or diphenylmethylene. And, in Chemical Formula 1, Z can be, for example, cyclohexane-1,1-diyl, O, S, SO, $SO_2$, or CO.

The repeat units of Chemical Formula 1 can be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, and 1,1-bis(4-hydroxyphenyl)-1-phenylethane, bis(4-hydroxyphenyl)diphenylmethane.

The expression 'derived from aromatic diol compounds' means that hydroxy groups of aromatic diol compounds and carbonate precursors react to form repeat units of Chemical Formula 1. For example, in case the aromatic diol compound of bisphenol A and carbonate precursor of triphosgene are polymerized, the repeat unit of Chemical Formula 1 can have the following Chemical Formula 1-1:

Chemical Formula 1-1

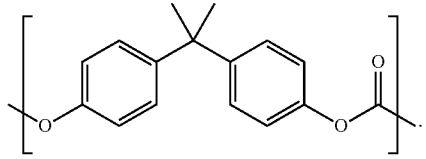

As the carbonate precursor, one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate can be used. Preferably, triphosgene or phosgene can be used.

The main chain of copolycarbonate comprises a polysiloxane structure in which aromatic groups linked by an ester group or repeat units including two or more aromatic groups linked by ester groups are introduced at the side chain, as the repeat units of Chemical Formula 2, in addition to the repeat units of Chemical Formula 1.

By the introduction of the polysiloxane structure at the main chain, the copolycarbonate can exhibit excellent impact resistance, particularly low temperature impact resistance, and excellent chemical resistance. And, by the introduction of aromatic groups linked by an ester group or repeat units including two or more aromatic groups linked by ester groups at the side chain of the polysiloxane structure, it can exhibit remarkably improved weather resistance while maintaining excellent impact resistance.

The repeat unit of Chemical Formula 2 can be formed by reacting a modified polyorganosiloxane of following Chemical Formula 3 comprising a polysiloxane structure in which aromatic groups linked by an ester group or repeat units including two or more aromatic groups linked by ester groups are introduced at the side chain, in which hydroxy groups are bonded at both ends, with carbonate precursors:

Chemical Formula 3

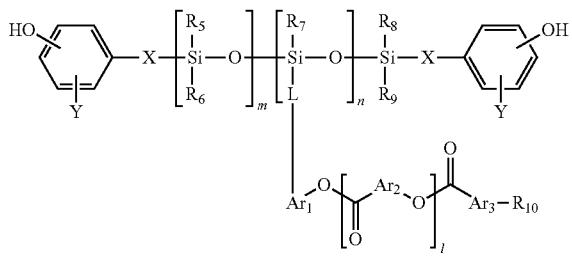

wherein in Chemical Formula 3, $R_5$ to $R_{10}$, X, Y, L, $Ar_1$ to $Ar_3$, m, n, and l are as defined in Chemical Formula 2.

The modified polyorganosiloxane of Chemical Formula 3 can be prepared, for example, by preparing a polysiloxane structure in which aromatic groups linked by an ester group or repeat units including two or more aromatic groups linked by ester groups are introduced, as repeat units repeated n times, and then, adding to the polysiloxane structure in which aromatic groups linked by an ester group or repeat units including two or more aromatic groups linked by ester groups are introduced, a polysiloxane structure of which side chain is not modified, as repeat units repeated m times, and adding end groups including hydroxyphenyl to the prepared polysiloxane structures.

For the preparation of the modified polyorganosiloxane, a metal catalyst can be used. As the metal catalyst, a Pt catalyst can be used, and as the Pt catalyst, one or more catalysts selected from the group consisting of an Ashby catalyst, a Karstedt catalyst, a Lamoreaux catalyst, a Speier catalyst, $PtCl_2$ (COD), $PtCl_2$ (benzonitrile)$_2$, and $H_2PtBr_6$ can be used.

In Chemical Formula 2, $R_5$, $R_6$, $R_7$, $R_8$ and $R_9$ can be each independently hydrogen, methyl, ethyl, propyl, 3-phenylpropyl, 2-phenylpropyl, fluoro, chloro, bromo, iodo, methoxy, ethoxy, propoxy, allyl, 2,2,2-trifluoroethyl, 3,3,3-trifluoropropyl, phenyl, or naphthyl. More specifically, $R_5$, $R_6$, $R_7$, $R_8$ and $R_9$ can be each independently $C_{1-10}$ alkyl, $C_{1-6}$ alkyl, $C_{1-3}$ alkyl, or methyl.

In Chemical Formula 2, $R_{10}$ can be hydrogen, methyl, ethyl, propyl, fluoro, chloro, bromo, iodo, hydroxy, methoxy, ethoxy, propoxy, or phenyl. More specifically, $R_{10}$ can be hydrogen or hydroxy.

In Chemical Formula 2, each X can be independently $C_{2-10}$ alkylene, —(OCO)—($C_{2-10}$ alkylene)-, or —(COO)—($C_{2-10}$ alkylene)-. Specifically, each X can be $C_{2-5}$ alkylene, —(OCO)—($C_{2-5}$ alkylene)-, or —(COO)—($C_{2-5}$ alkylene)-, and more specifically, each X can be propane-1,3-diyl.

In Chemical Formula 2, each Y can be independently hydrogen, or methoxy.

In Chemical Formula 2, L can be $C_{3-5}$ alkylene. More specifically, L can be propane-1,3-diyl.

In Chemical Formula 2, $Ar_1$, $Ar_2$ and $Ar_3$ can be each independently benzenediyl, methylbenzenediyl, methoxybenzenediyl, dimethylbenzenediyl, dimethoxybenzenediyl, naphthalenediyl, methylnaphthalenediyl, methoxynaphthalenediyl, dimethylnaphthalenediyl or dimethoxynaphthalenediyl. More specifically, $Ar_1$, $Ar_2$ and $Ar_3$ can be each independently benzen-1,2-diyl, benzene-1,3-diyl or benzene-1,4-diyl.

For one example, the repeat unit of Chemical Formula 2 can have the following Chemical Formula 2-1:

Chemical Formula 2-1

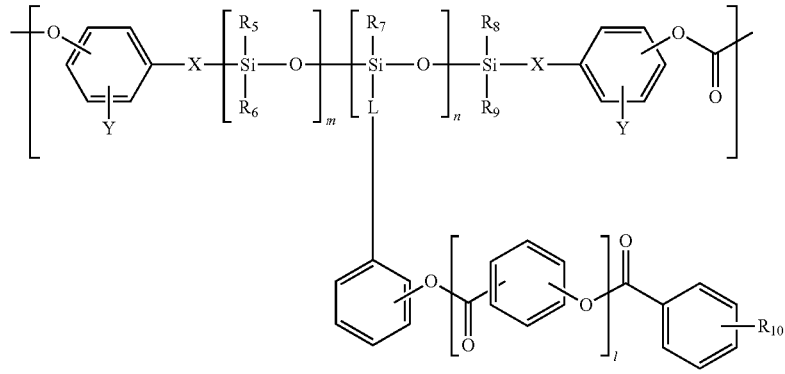

wherein in Chemical Formula 2-1, $R_5$ to $R_{10}$, X, Y, L, m, n, and l are as defined in Chemical Formula 2.

For another example, the repeat unit of Chemical Formula 2 can have the following Chemical Formula 2-2:

Chemical Formula 2-2

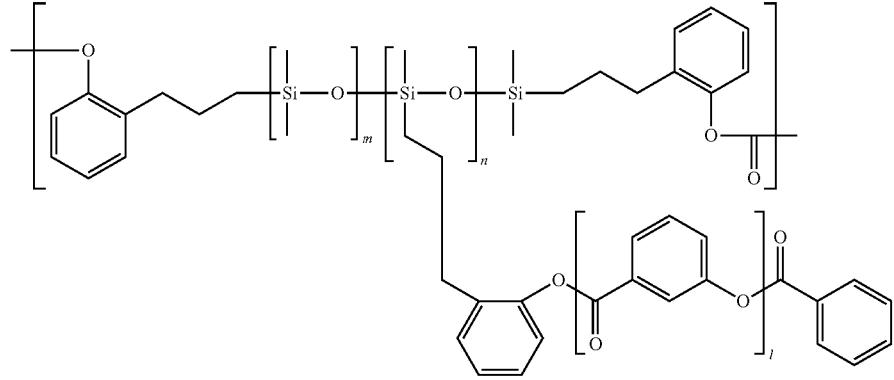

wherein in Chemical Formula 2-2:

m, n, and l are as defined in Chemical Formula 2.

In Chemical Formula 2, Chemical Formula 2-1 and Chemical Formula 2-2, m and n are only to represent the ratio of repeat units repeated m times and repeat units repeated n times, and the repeat units repeated m times and the repeat units repeated n times can be randomly arranged.

The n and m can be each independently an integer from 1 to 999 or an integer from 1 to 200. Specifically, n can be an integer from 10 or more, 15 or more, 20 or more, or 25 or more, to 100 or less, 50 or less, 45 or less, 40 or less, 35 or less, or 30 or less, and m can be an integer from 2 or more, 3 or more, 5 or more, or 7 or more, to 100 or less, 50 or less, 25 or less, 15 or less, or 10 or less.

In Chemical Formula 2, Chemical Formula 2-1 and Chemical Formula 2-2, l can be an integer from 0 to 200, 0 to 100, 0 to 50, 0 to 20, or 0 to 10.

In the copolycarbonate, the repeat units of Chemical Formula 2 can be present in an amount from 1 to 99 wt %, 1 to 80 wt %, 1 to 70 wt %, 1 to 60 wt %, 1 to 50 wt %, 1 to 40 wt %, 1 to 30 wt %, 1 to 20 wt %, 3 to 20 wt %, or 5 to 20 wt %, based on the total weight of the repeat units of Chemical Formulas 1 and 2.

The copolycarbonate can be prepared by polymerizing a composition comprising aromatic diol compounds, carbonate precursors, and the modified polyorganosiloxane of Chemical Formula 3. The aromatic diol compound, carbonate precursor, and modified polyorganosiloxane of Chemical Formula 3 are as explained above.

During the polymerization, aromatic diol compounds and the modified polyorganosiloxane of Chemical Formula 3 can be used in an appropriate amount according to the amount of repeat units of Chemical Formulas 1 and 2 to be introduced in the copolycarbonate. And, the carbonate precursors can be used at the mole number substantially equivalent to aromatic diol compounds and modified polyorganosiloxane of Chemical Formula 3.

It is preferable that the polymerization is conducted by interfacial polymerization, and during the interfacial polymerization, the polymerization reaction can be conducted at atmospheric pressure and low temperature, and it is easy to control molecular weight. And, the interfacial polymerization can comprise the steps of conducting pre-polymerization, introducing a coupling agent, and then, conducting polymerization again, and in this case, high molecular weight copoycarbonate can be obtained.

It is preferable that the polymerization temperature is 0° C. to 40° C., and the reaction time is 10 minutes to 5 hours. And, it is preferable to maintain pH at 9 or more or 11 or more during the reaction.

The solvent that can be used in the polymerization is not specifically limited as long as it is used for the polymerization of copolycarbonate in the art, and for example, halogenated hydrocarbon such as methylene chloride, chlorobenzene, and the like can be used.

And, it is preferable that the polymerization is conducted in the presence of an acid binding agent, and as the acid binding agent, alkali metal hydroxide such as sodium hydroxide, potassium hydroxide, and the like, or amine compounds such as pyridine, and the like can be used.

And, it is preferable that in order to control the molecular weight of copolycarbonate, the polymerization is conducted in the presence of a molecular weight control agent. As the molecular weight control agent, $C_{1-20}$ alkylphenol can be used, and as specific examples thereof, p-tert-butylphenol, p-cumylphenol, decylphenol, dodecylphenol, tetradecylphenol, hexadecylphenol, octadecylphenol, eicosylphenol, docosylphenol or triacontylphenol can be used. The molecular weight control agent can be introduced before, during or after the initiation of polymerization. The molecular weight control agent can be included in an amount from 0.01 parts by weight or more, 0.1 parts by weight or more, or 1 part by weight or more, to 10 parts by weight or less, 6 parts by weight or less, or 5 parts by weight or less, based on 100 parts by weight of aromatic diol compounds, and within these ranges, desired molecular weight can be obtained.

And, in order to accelerate the polymerization reaction, a reaction accelerator such as tertiary amine compounds such as triethylamine, tetra-n-butylammonium bromide, tetra-n-butyl phosphonium bromide, and the like, quaternary ammonium compounds, quaternary phosphonium compounds, and the like can be additionally used.

The copolycarbonate can preferably have a weight average molecular weight (g/mol) of 1,000 to 100,000, more preferably 15,000 to 35,000. More preferably, the weight average molecular weight can be from 20,000 or more, 21,000 or more, 22,000 or more, 23,000 or more, 24,000 or more, 25,000 or more, 26,000 or more, 27,000 or more, or 28,000 or more to 34,000 or less, 33,000 or less, or 32,000 or less.

Meanwhile, according to another embodiment of the present disclosure, there is provided a polycarbonate composition comprising the copolycarbonate.

The copolycarbonate has been explained in detail before, and the detailed explanations are omitted.

The polycarbonate composition can comprise one or more, two or more, or three or more kinds of the above explained copolycarbonates.

And, the polycarbonate composition can further comprise polycarbonate that does not comprise repeat units of Chemical Formula 2.

Specifically, as the polycarbonate that does not comprise repeat units of Chemical Formula 2, for example, polycarbonate comprising one or more kinds of repeat units of Chemical Formula 1; or polycarbonate comprising one or more kinds of repeat units of Chemical Formula 1, and repeat units of the following Chemical Formula 4 in which aromatic groups linked by an ester group or repeat units including two or more aromatic groups linked with ester groups are not introduced at the side chain in the Chemical Formula 2, and the like can be included:

Chemical Formula 4

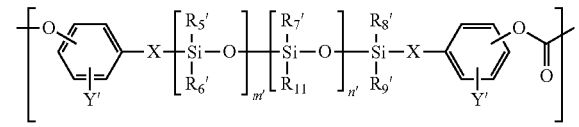

wherein in Chemical Formula 4:

$R_5'$, $R_6'$, $R_7'$, $R_8'$, $R_9'$, X', Y', m' and n' are respectively as defined for $R_5$, $R_6$, $R_7$, $R_8$, $R_9$, X, Y, m and n of Formula 2, and $R_1$ is as defined for $R_7'$.

The polycarbonate composition can further comprise various additives known in the art.

The polycarbonate composition particularly has excellent low temperature impact resistance, and weather resistance. Thus, using the composition, it is expected that automobile exterior material of which properties are not changed even under extreme environment can be provided.

Hereinafter, the actions and effects of the invention will be explained in detail through specific examples. However, these examples are presented only as the illustrations of the invention, and the scope of the right of the invention is not limited thereby.

Preparation Example 1: Preparation of Modified Polyorganosiloxane

Into a 1 L flask, 9.62 g (40.0 mmol) of tetramethylcyclotetrasiloxane was introduced, 0.005 g (25 ppm) of Karstedt's platinum catalyst was introduced, and reacted at 90° C. for 1 hour, and then, 1.49 g (11.1 mmol) of 2-allylphenol was added and reacted for 3 hours. And, at room temperature, 200 mL of methylene chloride solvent was introduced, and 1.36 g of benzoic acid was added dropwise. Thereafter, 1.41 g of oxalyl chloride and 0.01 g of DMF were added dropwise and reacted at room temperature for about 4 hours, and the solvent was removed through a rotary vacuum evaporator.

To the modified polyorganosiloxane, 38.56 g (130.0 mmol) of octamethylcyclotetrasiloxane, and 2.44 g (18.2 mmol) of tetramethyldisiloxane were added, and then, the mixture was introduced into a 1 L flask together with 1 part by weight of acid clay (DC-A3), based on 100 parts by weight of octamethylcyclotetrasiloxane, and reacted at 60° C. for 4 hours. After the reaction was completed, it was diluted with ethyl acetate and rapidly filtered using CELITE.

To the obtained polyorganosiloxane of which ends are not modified, 0.01 g (50 ppm) of Karstedt's platinum catalyst was added and reacted at 90° C. for 1 hour, and then, 4.93 g (36.8 mmol) of 2-allylphenol was additionally added and further reacted for 3 hours. After the reaction was completed, unreacted siloxane was removed by evaporation at 120° C., 1 torr. The structure of the modified polyorganosiloxane thus prepared was confirmed by $^1$H NMR, wherein the repeat units n and m were respectively 26 and 8, and l was 0.

Preparation Example 2: Preparation of Modified Polyorganosiloxane

Into a 1 L flask, 9.62 g (40.0 mmol) of tetramethylcyclotetrasiloxane was introduced, 0.005 g (25 ppm) of Karstedt's platinum catalyst was introduced, and reacted at 90° C. for 1 hour, and then, 1.49 g (11.1 mmol) of 2-allylphenol was added and reacted for 3 hours. And, at room temperature, 200 mL of methylene chloride solvent was introduced, and 4.60 g of 3-hydroxybenzoic acid was added dropwise. Thereafter, 4.07 g of oxalyl chloride and 0.01 g of DMF were added dropwise and stirred at room temperature for about 4 hours, and 1.36 g of benzoic acid and 1.41 g of oxalyl chloride were additionally added and further stirred at room temperature for about 4 hours to complete the reaction, and the solvent was removed through a rotary vacuum evaporator.

To the modified polyorganosiloxane, 38.56 g (130.0 mmol) of octamethylcyclotetrasiloxane, and 2.44 g (18.2 mmol) of tetramethyldisiloxane were added, and then, the mixture was introduced into a 1 L flask together with 1 part by weight of acid clay (DC-A3), based on 100 parts by weight of octamethylcyclotetrasiloxane, and reacted at 60° C. for 4 hours. After the reaction was completed, it was diluted with ethyl acetate and rapidly filtered using CELITE.

To the obtained polyorganosiloxane of which ends are not modified, 0.01 g (50 ppm) of Karstedt's platinum catalyst was added and reacted at 90° C. for 1 hour, and then, 4.93 g (36.8 mmol) of 2-allylphenol was additionally added and further reacted for 3 hours. After the reaction was completed, unreacted siloxane was removed by evaporation at 120° C., 1 torr. The structure of the modified polyorganosiloxane thus prepared was confirmed by $^1$H NMR, wherein the repeat units n and m were respectively 26 and 8, and l was 3.

Preparation Example 3: Preparation of Modified Polyorganosiloxane 50.43 g (170.0 mmol) of tetramethylcyclotetrasiloxane, 38.56 g (130.0 mmol) of octamethylcyclotetrasiloxane, and 2.44 g (18.2 mmol) of tetramethyldisiloxane were mixed, and then, the mixture was introduced into a 1 L flask together with 1 part by weight of acid clay (DC-A3), based on 100 parts by weight of octamethylcyclotetrasiloxane and reacted at 60° C. for 4 hours. After the reaction was completed, it was diluted with ethyl acetate and rapidly filtered using CELITE.

To the obtained polyorganosiloxane of which ends are not modified, 0.01 g (50 ppm) of Karstedt's platinum catalyst was added and reacted at 90° C. for 1 hour, and then, 4.93 g (36.8 mmol) of 2-allylphenol was additionally added and further reacted for 3 hours. After the reaction was completed, unreacted siloxane was removed by evaporation at 120° C., 1 torr. The structure of the modified polyorganosiloxane thus prepared was confirmed by $^1$H NMR, wherein the repeat number of repeat units derived from siloxane was 34.

Example 1: Preparation of Copolycarbonate

Into a polymerization reactor, 1784 g of water, 385 g of NaOH, and 232 g of BPA (bisphenol A) were introduced, and mixed and dissolved under nitrogen atmosphere. 4.3 g of PTBP (para-tert butylphenol) and 26.3 g of modified polyorganosiloxane prepared in Preparation Example 1 dissolved in MC (methylene chloride) were added thereto. And then, 130 g of TPG (triphosgene) was dissolved in MC, and introduced and reacted for 1 hour while maintaining pH at 11 or more using an aqueous NaOH solution, and after 10 minutes, 2.18 g of TEA (triethylamine) was introduced to progress a coupling reaction. After the total reaction time of 1 hour 20 minutes, pH was lowered to 4 or less using an aqueous solution of 35 wt % HCl to remove TEA, and the reaction product was washed with distilled water three times to adjust the pH of the produced polymer to 6-7. The obtained polymer was reprecipitated in a mixed solution of methanol and hexane, and then, dried at 120° C. to obtain the final copolycarbonate. It was confirmed that the obtained copolycarbonate comprises repeat units derived from the modified polyorganosiloxane prepared in Preparation Example 1 as the repeat units of Chemical Formula 2, in an amount of 10 wt %, based on the total repeat units, and the weight average molecular weight, measured by GPC using PC Standard, is 29,800 g/mol.

Example 2: Preparation of Copolycarbonate

Copolycarbonate was prepared by the same method as Example 1, except that the modified polyorganosiloxane prepared in Preparation Example 2 was used instead of the modified polyorganosiloxane prepared in Preparation Example 1. The copolycarbonate comprises repeat units derived from the modified polyorganosiloxane prepared in Preparation Example 2 as the repeat units of Chemical Formula 2, in an amount of about 10 wt %, based on the total repeat units.

Example 3: Preparation of Copolycarbonate

Copolycarbonate was prepared by the same method as Example 1, except that the amount of the modified polyorganosiloxane prepared in Preparation Example 1 was changed to 13.16 g instead of 26.30 g in Example 1. The copolycarbonate comprises repeat units derived from the modified polyorganosiloxane prepared in Preparation Example 1 as the repeat units of Chemical Formula 2, in an amount of about 5 wt %, based on the total repeat units.

Example 4: Preparation of Copolycarbonate

Copolycarbonate was prepared by the same method as Example 2, except that the amount of the modified polyorganosiloxane prepared in Preparation Example 2 was changed to 13.16 g instead of 26.30 g in Example 2. The copolycarbonate comprises repeat units derived from the modified polyorganosiloxane prepared in Preparation Example 2 as the repeat units of Chemical Formula 2, in an amount of about 5 wt %, based on the total repeat units.

Example 5: Preparation of a Polycarbonate Composition

The copolycarbonate prepared in Example 1 and the polycarbonate prepared in the following Comparative Example 1 were mixed at a weight ratio of 50:50 and pelletized using a vented twin screw extruder to prepare a polycarbonate composition.

Example 6: Preparation of a Polycarbonate Composition

The copolycarbonate prepared in Example 2 and the polycarbonate prepared in the following Comparative Example 1 were mixed at a weight ratio of 50:50 and pelletized using a vented twin screw extruder to prepare a polycarbonate composition.

Comparative Example 1: Preparation of Polycarbonate

Polycarbonate was prepared by the same method as Example 1, except that the modified polyorganosiloxane of Preparation Example 1 was not used.

Comparative Example 2: Preparation of Polycarbonate

Polycarbonate was prepared by the same method as Example 1, except that the modified polyorganosiloxane prepared in Preparation Example 3 was used instead of the modified polyorganosiloxane prepared in Preparation Example 1.

Experimental Example: Evaluation of the Properties of (Co)Polycarbonate

The properties of (co)polycarbonates prepared in Examples and Comparative Examples were evaluated and the results were shown in the following Table 1.

<Preparation of a Test Specimen>

To 1 part by weight of each (co)polycarbonate or polycarbonate composition prepared in Examples and Comparative Examples, 0.050 parts by weight of tris(2,4-di-tert-butylphenyl)phosphite, 0.010 parts by weight of octadecyl 3-(3,5-di-tert-butyl-4-hydroxyphenyl)propionate, and 0.030 parts by weight of pentaerythritol tetrastearate were added, and the reaction mixture was pelletized using a vented Φ19 mm twin screw extruder, and then, injection molded at a cylinder temperature of 300° C. and a mold temperature of 90° C. using HAAKE Minijet injection molding machine to prepare test specimens.

1) Weight average molecular weight (Mw): measured by GPC using PC standard using Agilent 1200 series.
2) Melt Index (MI): measured according to ASTM D1238 (300° C., 1.2 kg condition).
3) Transmittance: Transmittance was measured at a range of about 350 to 1050 nm using UltraScan PRO (manufactured by HunterLab) according to ASTM D1003.
4) Yellow Index (YI): YI value at room temperature (20° C.) was measured using UltraScan PRO (manufactured by HunterLab) according to ASTM D1925.
5) Room temperature and low temperature impact strengths: Room temperature and low temperature impact strengths were measured respectively at 23° C. and −30° C. according to ASTM D256 (⅛ inch, Notched Izod).
6) Weather resistance: For a test specimen with a thickness of ⅛ inch, L, a and b values were measured using UltraScan PRO (Hunterlab). Thereafter, the test specimen was left for 2250 hours using Weather-Ometer® (Ci5000) according to ASTM D7869, and then, L, a and b values were measured by the same method and put in the following Formula 1 to calculate ΔE.

$$\Delta E = \sqrt{\Delta L^2 + \Delta a^2 + \Delta b^2} \quad \text{Formula 1}$$

TABLE 1

| | Mw (g/mol) | Melt index (g/10 min) | Transmittance (%) | Yellow index (YI) | Room temperature impact strength (23° C., J/m) | Low temperature impact strength (−30° C., J/m) | Weather resistance (ΔE) |
|---|---|---|---|---|---|---|---|
| Example 1 | 29,800 | 12.2 | 90.3 | 5.8 | 610 | 530 | 8.6 |
| Example 2 | 30,300 | 11.9 | 90.4 | 5.4 | 650 | 490 | 7.8 |
| Example 3 | 29,300 | 12.9 | 90.6 | 6.2 | 830 | 710 | 6.8 |
| Example 4 | 29,500 | 13.0 | 90.3 | 6.1 | 820 | 730 | 5.6 |
| Example 5 | 29,800 | 11.8 | 89.3 | 3.8 | 850 | 630 | 8.2 |
| Example 6 | 30,000 | 11.7 | 89.5 | 4.2 | 860 | 680 | 6.7 |
| Comparative Example 1 | 29,700 | 11.9 | 91.3 | 1.4 | 880 | 230 | 35.1 |
| Comparative Example 2 | 30,100 | 11.2 | 90.1 | 5.5 | 640 | 510 | 28.3 |

Referring to Table 1, it is confirmed that Examples 1 to 6 using copolycarbonates comprising repeat units of Chemical Formulas 1 and 2 exhibit excellent impact resistance, particularly low temperature impact resistance, and remarkably improved weather resistance, compared to Comparative Example 1, while maintaining excellent properties of polycarbonate of Comparative Example 1.

To the contrary, it is confirmed that Comparative Example 2 using copolycarbonate that does not comprise the repeat units of Chemical Formula 2, fails to exhibit low temperature impact resistance and weather resistance equivalent to those of Examples.

The invention claimed is:

1. A copolycarbonate, comprising repeat units of the following Chemical Formula 1 and repeat units of the following Chemical Formula 2:

Chemical Formula 1

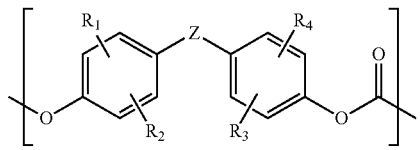

wherein in Chemical Formula 1:

$R_1$ to $R_4$ are each independently hydrogen, $C_{1-10}$ alkyl, $C_{1-10}$ alkoxy, or halogen; and Z is $C_{1-10}$ alkylene that is unsubstituted or substituted with phenyl, $C_{3-15}$ cycloalkylene that is unsubstituted or substituted with $C_{1-10}$ alkyl, O, S, SO, $SO_2$, or CO, Chemical Formula 2

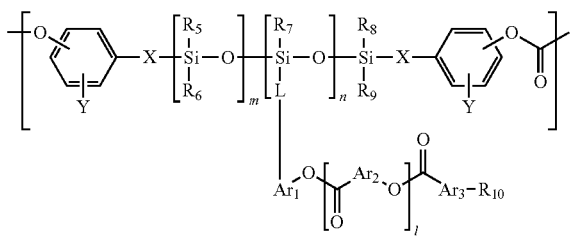

wherein in Chemical Formula 2:

$R_5$, $R_6$, $R_7$, $R_8$ and $R_9$ are each independently hydrogen; halogen; allyl; $C_{1-15}$ alkyl that is unsubstituted or substituted with one or more selected from the group consisting of halogen, $C_{1-10}$ alkoxy and $C_{6-20}$ aryl; $C_{1-10}$ alkoxy that is unsubstituted or substituted with one or more selected from the group consisting of halogen, $C_{1-10}$ alkoxy and $C_{6-20}$ aryl; or $C_{6-20}$ aryl that is unsubstituted or substituted with one or more selected from the group consisting of halogen, $C_{1-15}$ alkyl and $C_{1-10}$ alkoxy;

$R_{10}$ is hydrogen, $C_{1-6}$ alkyl, halogen, hydroxy, $C_{1-6}$ alkoxy, or $C_{6-20}$ aryl;

each X is independently $C_{1-10}$ alkylene, —(OCO)—($C_{1-10}$ alkylene)-, or —(COO)—($C_{1-10}$ alkylene)-;

each Y is independently hydrogen, $C_{1-6}$ alkyl, halogen, hydroxy, $C_{1-6}$ alkoxy, or $C_{6-20}$ aryl;

L is $C_{3-10}$ alkylene;

$Ar_1$, $Ar_2$ and $Ar_3$ are each independently $C_{6-20}$ arylene that is unsubstituted or substituted with one or more selected from the group consisting of halogen, $C_{1-15}$ alkyl and $C_{1-10}$ alkoxy; and n and m are each independently an integer from 1 to 999, and l is an integer from 0 to 999.

2. The copolycarbonate according to claim 1, wherein the repeat units of Chemical Formula 2 have the following Chemical Formula 2-1:

Chemical Formula 2-1

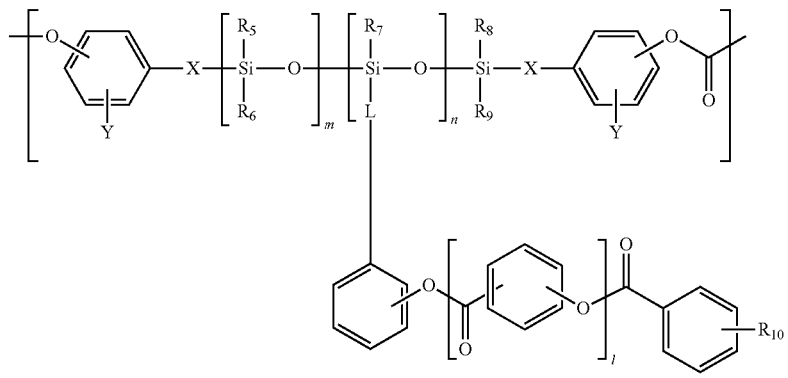

wherein in Chemical Formula 2-1:

$R_5$, $R_6$, $R_7$, $R_8$ and $R_9$ are each independently hydrogen; halogen; allyl; $C_{1-15}$ alkyl that is unsubstituted or substituted with one or more selected from the group consisting of halogen, $C_{1-10}$ alkoxy and $C_{6-20}$ aryl; $C_{1-10}$ alkoxy that is unsubstituted or substituted with one or more selected from the group consisting of halogen, $C_{1-10}$ alkoxy and $C_{6-20}$ aryl; or $C_{6-20}$ aryl that is unsubstituted or substituted with one or more selected from the group consisting of halogen, $C_{1-15}$ alkyl and $C_{1-10}$ alkoxy;

$R_{10}$ is hydrogen, $C_{1-6}$ alkyl, halogen, hydroxy, $C_{1-6}$ alkoxy, or $C_{6-20}$ aryl;

each X is independently $C_{1-10}$ alkylene, —(OCO)—($C_{1-10}$ alkylene)-, or —(COO)—($C_{1-10}$ alkylene)-;

each Y is independently hydrogen, $C_{1-6}$ alkyl, halogen, hydroxy, $C_{1-6}$ alkoxy, or $C_{6-20}$ aryl;

L is $C_{3-10}$ alkylene;

n and m are each independently an integer from 1 to 999; and l is an integer from 0 to 999.

3. The copolycarbonate according to claim 1, wherein the repeat units of Chemical Formula 2 have the following Chemical Formula 2-2:

Chemical Formula 2-2

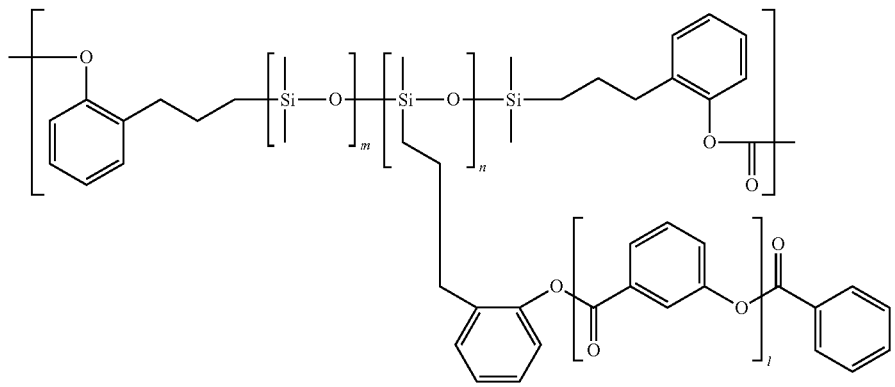

wherein in Chemical Formula 2-2:
n and m are each independently an integer from 1 to 999; and
l is an integer from 0 to 999.

4. The copolycarbonate according to claim 1, wherein the repeat units of Chemical Formula 2 are present in an amount from 5 to 20 wt %, based on the total weight of the repeat units of Chemical Formulas 1 and 2.

5. A polycarbonate composition, comprising the copolycarbonate of claim 1.

6. The polycarbonate composition according to claim 5, further comprising a polycarbonate that does not comprise repeat units of Chemical Formula 2.

* * * * *